No. 873,695. PATENTED DEC. 10, 1907.
D. K. ALLISON & G. F. DE WEIN.
HOOK ROD DISCONNECTING DEVICE.
APPLICATION FILED APR. 7, 1906.
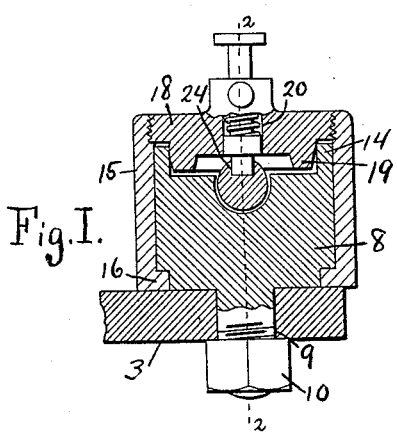
Fig. I.
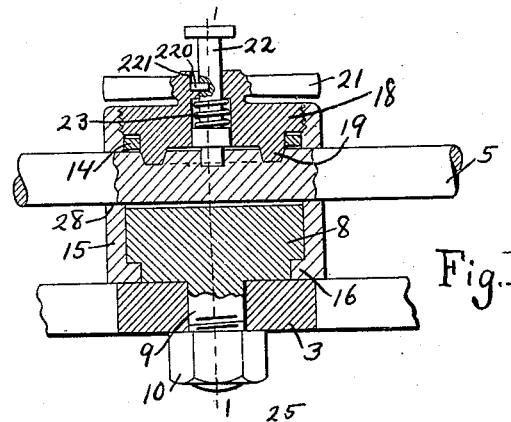
Fig. II.
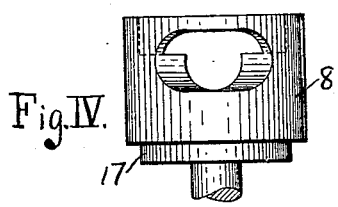
Fig. IV.
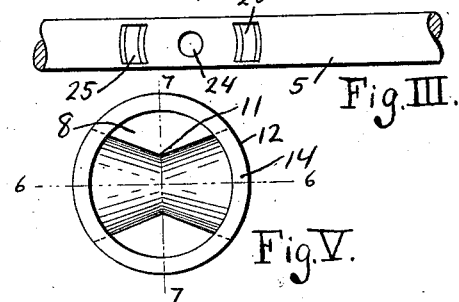
Fig. III.
Fig. V.
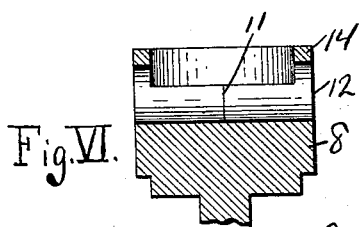
Fig. VI.
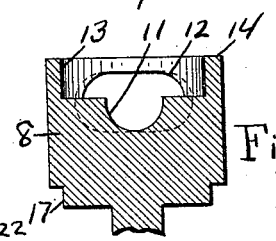
Fig. VII.
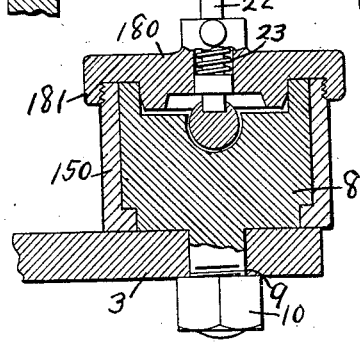
Fig. VIII.
WITNESSES:
Frank E. Dennett
Ella Brickell
D. K. Allison
G. F. De Wein
INVENTORS
BY
ATTORNEY
THE NORRIS PETERS CO., WASHINGTON, D. C.

UNITED STATES PATENT OFFICE.

DANIEL K. ALLISON AND GEORGE F. DE WEIN, OF MILWAUKEE, WISCONSIN, ASSIGNORS TO ALLIS-CHALMERS COMPANY, OF MILWAUKEE, WISCONSIN, A CORPORATION OF NEW JERSEY.

HOOK-ROD-DISCONNECTING DEVICE.

No. 873,695.     Specification of Letters Patent.     Patented Dec. 10, 1907.

Application filed April 7, 1906. Serial No. 310,411.

*To all whom it may concern:*

Be it known that we, DANIEL K. ALLISON and GEORGE F. DE WEIN, citizens of the United States, residing at Milwaukee, in the county of Milwaukee and State of Wisconsin, have invented certain new and useful Improvements in Hook-Rod-Disconnecting Devices, of which the following is a specification.

This invention relates to the valve operating mechanism used in steam engines of the "Corliss" type, and more particularly relates to certain improvements over the locking means disclosed and claimed in United States patent to Weber, No. 720,540, granted Feb. 10, 1903.

This invention involves fewer parts and results in a much simpler and solider construction having a larger and firmer bearing surface for the end thrust on the hook rod at its connection to the wrist plate.

The invention will be readily understood from the following description taken in connection with the accompanying drawing, and the novel features are particularly pointed out in the claims.

In the drawing forming part of this specification, and in which like reference numerals designate corresponding parts,—Figure 1 is a section through the connecting means in a plane at right angles to the hook rod and on the line 1—1 of Fig. 2. Fig. 2 is a section in a plane longitudinally of the rod and on the line 2—2 of Fig. 1. Fig. 3 is an elevation view of the hook rod. Fig. 4 is a side elevation of the head, on a slightly larger scale. Fig. 5 is an end view of the head. Fig. 6 is a section through the head and on the line 6—6 of Fig. 5. Fig. 7 is a section at right angles thereto and on the line 7—7 of Fig. 5. Fig. 8 is a sectional view similar to Fig. 1, but showing a modification.

The drawings show only a fragment of the wrist plate 3 and of the hook rod 5, as the invention does not reside in either, but only in the connecting means. A head 8 is firmly secured to the wrist plate by means of a threaded shank 9 and nut 10. This head 8 has an opening therethrough for the passage of the rod 5 and to accommodate for the necessary oscillatory movement of the plate and head. This opening is slightly larger than the rod at the center 11 to allow for angularity, and diverges laterally toward its ends 12. The outer end, as clearly shown in Figs. 4, 5 and 7 of the head 8, is provided with a socket 13 communicating with the rod opening, and surrounding this socket is an annular flange 14 constituting a bearing for the clamping screw fitting into the socket 13.

Surrounding the head 8 and oscillating on it as a bearing, is a collar 15 held from longitudinal movement by an inwardly directed flange 16 fitting into an annular recess 17 on the lower end of the head 8. The collar has openings 28 on opposite sides thereof fitting the rod 5 which passes therethrough. The collar extends a short distance beyond the head, and screw threads are provided in this extension. Secured to the upper end of the collar by means of screw threads fitting with those in the collar, is a clamping screw 18 having a beveled annular flange 19 on the inner side, a centrally disposed cavity 20 extending into the clamping screw from the inner side, and a handle 21, or other means, on the outer side for operating it. The clamping screw carries a stem 22 normally held inward by a spring 23 fitting in the cavity 20 and bearing on a shoulder or flange on the stem.

The wrist plate actuating rod 5 is provided with a socket 24 for receiving the end of the stem 22, and with oppositely disposed curved grooves 25 for receiving the opposite sides of the annular beveled flange 19 of the clamping screw.

It will be noted that the head 8 is rigidly secured to the wrist plate and moves therewith, and that the collar and clamping screw are rigid with the hook rod, so that when the engine is in operation these parts oscillate in respect to the head and plate. The power is applied as an alternating end thrust on the rod so as to oscillate the wrist plate 3. By this construction the bearing surface extends on the outside of the head 8 throughout its entire length. It is also desirable to extend the clamping screw inward so as to coact with an additional bearing surface on the inside of the flange 14 of the head. It may be preferable that the bearing surface be still further increased by making the flange 14 coextensive with the collar, extending the clamping screw across the outer end of the collar and securing it to the same by providing it with an inwardly extending flange screw threaded upon the outside of the collar, as shown for example by Fig. 8. Referring to said figure, the numeral 180 designates the clamping screw provided with an inwardly extending flange 181, which is screw-threaded on the interior thereof to engage with screw threads formed on the exterior of collar 150, the other parts of the device shown by Fig. 8 being the same as those shown by Fig. 1.

When it is desired to disconnect the hook rod 5 from operative engagement with the wrist plate 3, the stem 22 is withdrawn against the action of the spring and held out in any suitable manner, as for instance, by the lug 220 projecting from the stem 22 and entering the recess 221 in the top of the clamping screw 18 when in one position, or resting against the exterior surface of the clamping screw when the stem 22 has been withdrawn against the action of the spring until said lug clears recess 221, when the stem 22 is partially rotated to bring the lug and recess out of register. The clamping screw is then withdrawn until its beveled flange 19 no longer engages the grooves 25. The rod 5 may then reciprocate freely through the openings in the collar and head without oscillating the wrist plate. It is evident that this connecting means may be used in other relations than as the means for securing a hook rod to a wrist plate.

Having thus described our invention, what we claim as new and desire to secure by Letters Patent, is,—

1. A plate, a rod, a head secured directly to the plate and having an opening therethrough for the rod, a collar surrounding the head, and means carried by said collar for preventing longitudinal movement of the rod with respect to the head.

2. A plate, a rod, a head secured directly to the plate and having a bearing surface between the rod and the plate and extending beyond the rod, a collar surrounding the head and having a bearing surface contacting with the bearing surface of the head, and means for locking the collar to the rod.

3. A member, a rod for operating said member, and a connecting means for securing the rod to the member, comprising a head secured to the member, a collar surrounding said head and means secured to said collar and extending within the outer end of said head for preventing longitudinal movement of the rod with respect to the member.

4. A member, a rod for operating said member, a head secured to the member, and means for preventing longitudinal movement of the rod with respect to the member, said means having a portion thereof rotatable on the head, and a second portion carried by the first mentioned portion and having a bearing surface fitting within the upper end of the head.

5. A member, a rod, a head rigidly secured to the member, and means clamped to the rod bearing upon the outer and inner surfaces of the head.

6. A member, a rod and means for connecting the rod to the member, comprising a head rigidly secured to the member and extending beyond the rod, a rotatable collar surrounding the head and means for locking the collar to the rod.

7. The combination with a wrist plate of a cylindrical head secured thereto, a cylindrical collar surrounding said head, said collar and said head both being provided with apertures, a rod extended through said apertures, said rod being provided with grooves, and a flange secured to said collar and adapted to engage with said rod within said grooves.

In testimony whereof we affix our signatures in presence of two witnesses.

D. K. ALLISON.
G. F. DE WEIN.

Witnesses:
ELLA BRICKELL,
H. C. CASE.